US006631125B1

United States Patent
Longoni et al.

(10) Patent No.: US 6,631,125 B1
(45) Date of Patent: Oct. 7, 2003

(54) CHANNEL SET-UP IN WIDEBAND, CODE DIVISION MULTIPLE ACCESS SYSTEMS

(75) Inventors: Fabio Longoni, Espoo (FI); Sami Kekki, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/422,006

(22) Filed: Oct. 20, 1999

(51) Int. Cl.[7] ................................................. H04Q 7/28
(52) U.S. Cl. ...................................... 370/341; 370/441
(58) Field of Search ................................ 370/335, 341, 370/342, 441, 328, 329, 431, 468

(56) References Cited

U.S. PATENT DOCUMENTS

| | | | | |
|---|---|---|---|---|
| 5,751,761 A | * | 5/1998 | Gilhousen | 375/146 |
| 6,192,040 B1 | * | 2/2001 | Jalloul et al. | 370/335 |
| 6,246,673 B1 | * | 6/2001 | Tiedemann et al. | 370/333 |
| 6,304,563 B1 | * | 10/2001 | Blessent et al. | 370/335 |
| 6,347,091 B1 | * | 2/2002 | Wallentin et al. | 370/437 |
| 6,370,386 B1 | * | 4/2002 | Williams | 455/452 |
| 6,374,112 B1 | * | 4/2002 | Widegren et al. | 455/452 |
| 6,385,264 B1 | * | 5/2002 | Terasawa et al. | 375/371 |
| 6,393,047 B1 | * | 5/2002 | Popovic' | 375/140 |

FOREIGN PATENT DOCUMENTS

WO    WO 95/03652    2/1995

* cited by examiner

Primary Examiner—Ajit Patel
Assistant Examiner—Chirag Shah
(74) Attorney, Agent, or Firm—Cohen, Pontani, Lieberman & Pavane (57) ABSTRACT

Methods and systems for setting-up channels in third generation (3G) communication systems that utilize wideband, code division multiple access signaling protocols including the reserving of a branch of the channelisation code tree to set-up the channels. By reserving a branch of the tree, the channels can be automatically coded using the pre-reserved codes in the branch which eliminates the need for separate verification procedure to be performed to determine whether there are enough transport layer resources available to accommodate the new channel and whether the new channel will disturb or otherwise interfere with current channel data transport. Since the new channels are set-up using reserved codes, the transport layer resources already exist to accommodate the new channels and there can be no chance of existing channel interference.

16 Claims, 6 Drawing Sheets

CHANNEL SET-UP IN WIDEBAND, CODE DIVISION MULTIPLE ACCESS SYSTEMS

BACKGROUND OF THE INVENTION

1. Field of the Invention

The present invention relates generally to channel allocation in wideband code division multiple access (WCDMA) communication systems. More specifically, the invention relates to allocating resources in WCDMA systems and for fast channel set-up in WCDMA systems.

2. Description of Related Art

Third generation (3G) wireless communication services are rapidly being implemented on a world-wide basis, and standards for 3G systems are being developed which will implement WCDMA technology. Unlike prior narrowband code division multiple access (CDMA) systems, the 3G systems with WCDMA protocols will be versatile and specifically adapted to deliver high-speed data, high-quality sound and video services, and wideband voice services, all integrated seamlessly with Internet access. In particular, WCDMA systems have been designed for Internet-based packet-data up to 2 Mbps in stationary or office environments, and up to 384 kbps in wide area or mobile environments. Moreover, WCDMA systems are based on a completely new channel structure for all layers in the system which will greatly facilitate transport speed and greatly improve signal integrity.

The implementation of the new 3G wireless systems to integrate Internet access with high-speed data delivery will bring an ever-increasing need for fast switching and multiple channel management. From the experiences gleaned from the Global System for Mobile Communications (GSM) and other second generation (2G) systems, channel set-up and resource allocation problems inherent in such systems will be greatly multiplied in WCDMA systems, since these new systems will be heavily taxed at higher data transport rates and with denser channel requirements. Resource allocation in the transport layer of WCDMA systems and channel set-up times will be critical parameters for efficient operation of any 3G system under development. Additionally, as the international standards bodies promulgate the relevant 3G wireless communication systems standards for future implementation, transport efficiency and seamless interoperability between system vendors will require that channel set-up procedures and allocation principles be uniform and standardized. This need is particularly acute in WCDMA communication systems which will utilize a shared channel protocol.

WCDMA communication systems will have to implement fast, channel pre-reservation schemes. Such systems should maximize the use of system resources and provide for simple and efficient allocation of transport layer resources. Additionally, it would be beneficial if such WCDMA system protocols were interchangeable across all system vendors and in compliance with proposed and new 3G standards currently being promulgated.

SUMMARY OF THE INVENTION

The present invention provides for setting up channels in a WCDMA communication system through which WCDMA signals are transported in channels, and for effectively allocating WCDMA signal transport resources in the WCDMA system. A tree of channelisation codes is provided which sets out a channelisation protocol for the WCDMA communication system and which set forth channel data for formatting and transporting the WCDMA signals in particular channels. Preferably, at least one of the codes in the tree of codes is partitioned into a branch of codes which reserves transport layer resources for a channel that is assigned a code from the reserved branch. The channel is then set-up according to set-up data found in the branch of codes which relates to the channelisation protocol, thereby allocating the set of resources to the set-up channel according to the set-up data.

By pre-reserving transport layer resources in accordance with the present invention, fast channel set-up is accomplished as compared to prior channelisation techniques which have typically required a Connection Admission Control (CAC) function to verify first that there are enough transport layer resources for the new channel and that no existing connection becomes disturbed by introduction of the new channel. In 3G WCDMA systems, the invention will greatly reduce channel set-up times and will concomitantly increase data throughput in the system. This will be particularly important for high bandwidth signals that will be ubiquitous in 3G communication systems since wider data words and fast streaming data such as, for example, in video streaming will demand high performance wireless networks and Internet access. Such needs have not heretofore been fulfilled in the art.

These and other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference numerals identify similar elements throughout the several views.

DETAILED DESCRIPTION OF PREFERRED EMBODIMENTS

Figure 1:
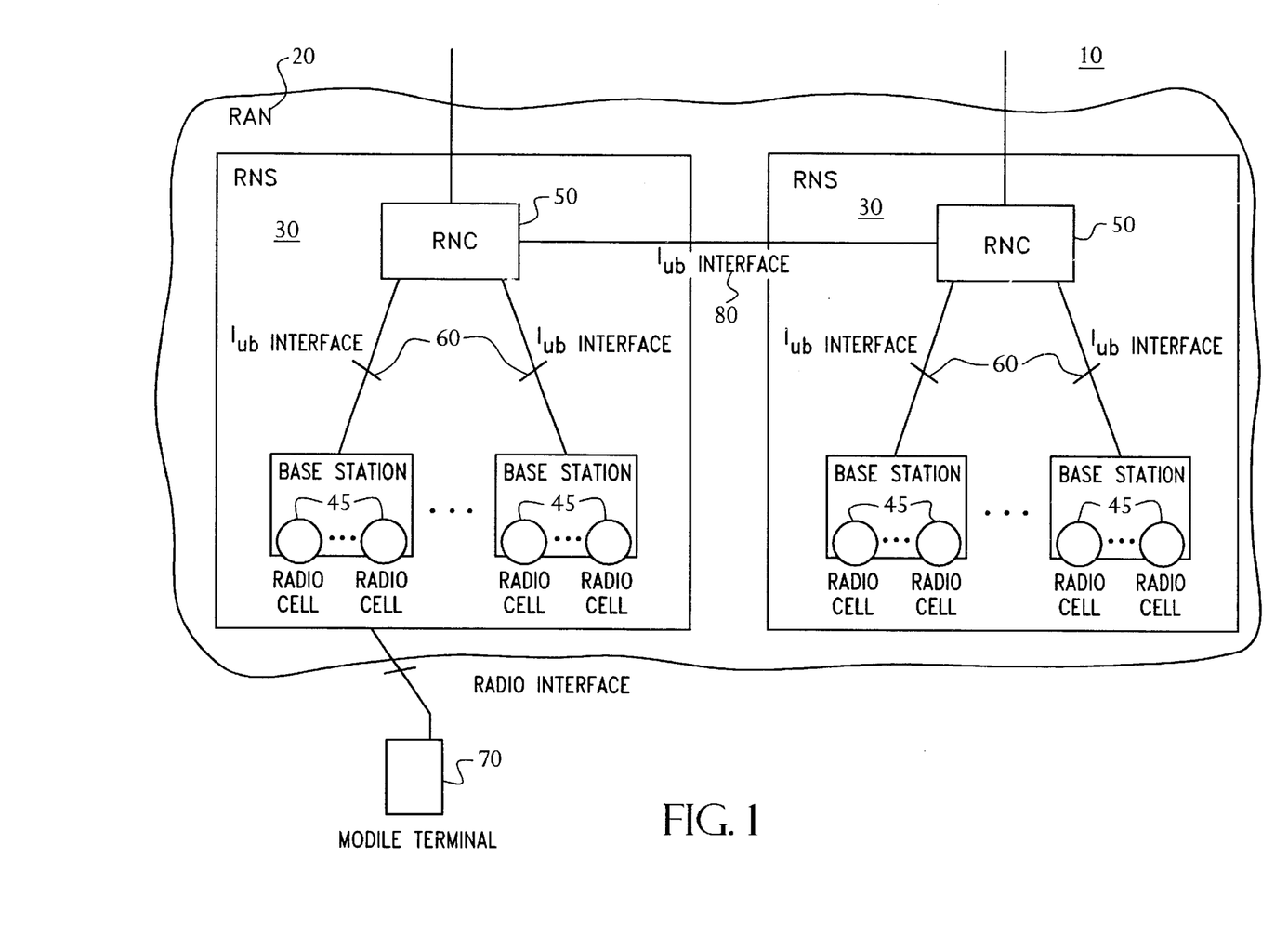
FIG. 1 is a block diagram of a 3G wireless communication system having two radio networks in which the present invention is implemented.

A block diagram of a 3G communication system utilizing WCDMA signaling and protocols of the present invention is illustrated at 10 in FIG. 1. While the invention is described herein with respect to 3G communication systems and WCDMA, the channelisation set-up and resource allocation disclosed herein are equally applicable to current 2G and pure cellular-systems. Any communication system which will transport data in channels and which requires fast channel set-up with efficient transport resource protocols will benefit by implementation of the present invention. Moreover, the term 3G is used herein in its broadest sense to include all wireline, cable, fiberoptic and wireless systems wherein WCDMA protocols and standards are implemented. For ease of description throughout, the 3G systems will be described as wireless 3G systems unless otherwise noted.

The 3G system 10 comprises a radio access network (RAN) shown generally at 20. The RAN 20 includes at least one radio network subsystem (RNS) 30 each of which is in communication with at least one base station 40 associated with each of the RNSs 30. For illustrative purposes, two RNSs 30 are shown.

Preferably, each RNS 30 further comprises a radio network controller (RNC) 50 which includes a microcontroller for controlling the data flow and data manipulation which will occur within each RNS 30. More preferably, an interface (Iub) 60 is placed between each RNC 50 and its respective base station 40 which routes data to the RNC 50 and which coordinates data transmission in the respective RNS 30 as well as through the transport layer to be described in more detail below. Still more preferably, each RNS 30 communicates with a mobile terminal 70 through base stations 40. Mobile terminals 70 may be digital or cellular mobile phones, Internet terminals, computers, microcontrollers and any other devices which are adapted to transport, create and/or process data in a 3G system. Even more preferably, base stations 40 are "node B" devices. Node B devices are currently being standardized by the international bodies that are setting up the protocols to be used in 3G systems. Node B devices are logical devices and will be typically connected to the RNCs 50 through the Iub interfaces 60. All current and future developed node B devices that communicate with RNCs 50 through Iubs 60 and equivalents thereof are intended to be within the scope of the present invention. In preferred embodiment of the invention, base stations 40 include radio cells 45 that directly communicate with the mobile terminals 70. The radio cells 45 are preferably radio transceivers.

FIG. 1 illustrates a Universal Mobile Telecommunication Service (UMTS) system. Such UMTS systems will encompass 3G technology and are intended to be fully compatible with all Internet access issues so that the mobile terminals 70 and base stations 40 can provide seamless access with the Internet. In a preferred form of the UMTS systems, an interface (Iur) 80 is provided between RNSs 30, and particularly to coordinate and facilitate controlling data transport between the RNSs 30. More 89 particularly, Iur 80 provides a data link between each RNC 50 in the RNSs 30 so that a transport layer is established between the RNSs 30 for data communication throughout the UMTS system. Thus, a transport layer is established between the Iub/Iur interfaces in a 3G UMTS system which will comprise certain data resources that must be allocated throughout the interfaces in order to provide for efficient data transfer between RNSs and the transport layer. As known by those skilled in the art, a transport layer is not a separate physical device, but represents all the transport facilities and resources within these facilities that are needed for data transmission on the terrestrial interfaces like the Iub and Iur. These interfaces may also be satellite based. Transport facilities are the transport layer part of the RNC, node B (for example, ATM switching and termination, transmission interfaces, etc.), as well as transmission equipment like cross-connects and ATM switches along the route between the RNCs and node Bs. It is useful to describe certain aspects of communication systems in terms of the transport layer since data and signal flow can be conceptually developed and easily understood with respect to such a construct.

Figure 2A:
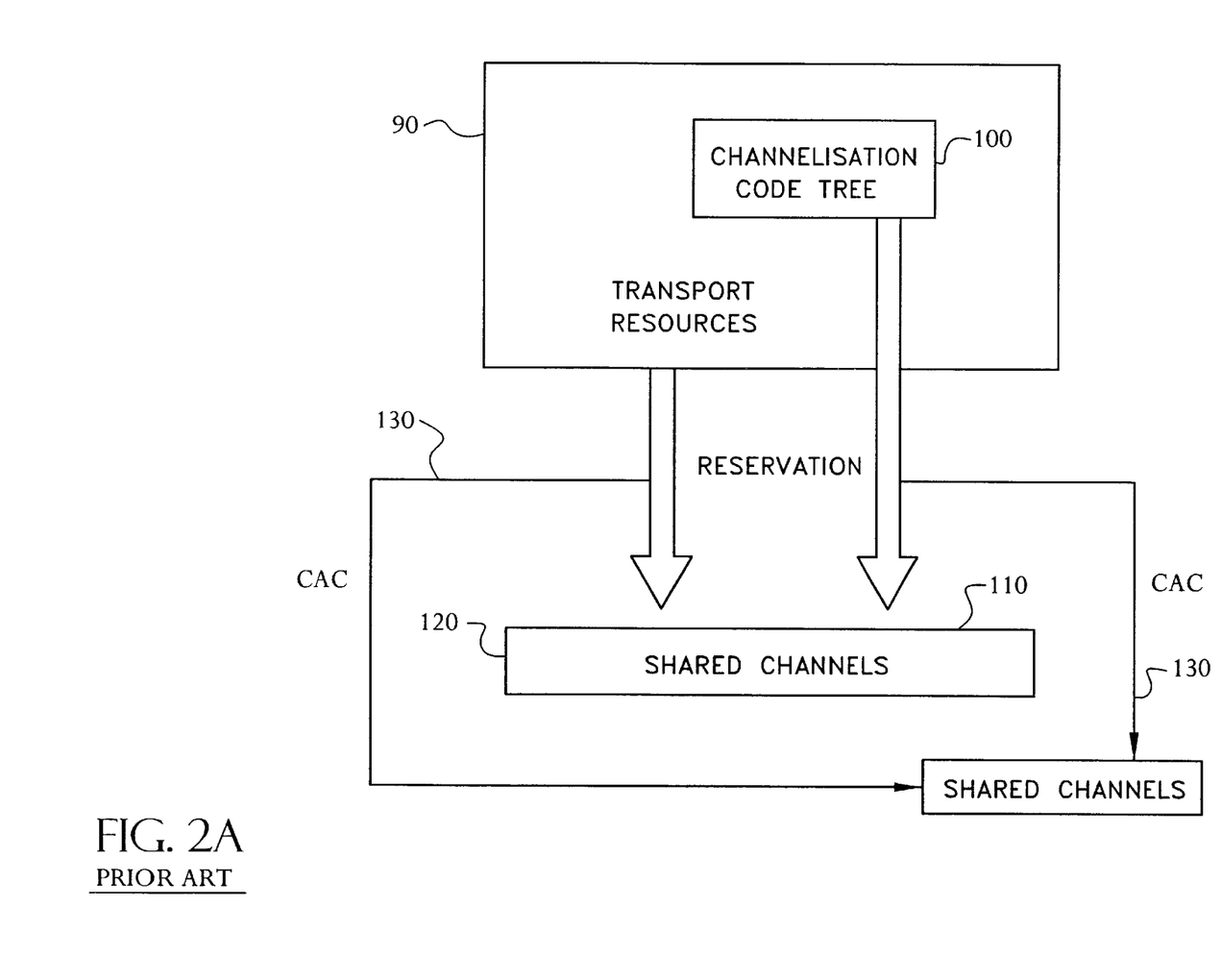
FIG. 2A depicts a simplified block diagram of a prior art transport layer wherein a CAC function is implemented to verify the availability of channel resources.

A prior art transport layer for an exemplary 2G system is depicted in FIG. 2 at 90. This transport layer 90 is analogously created by the required interaction between interfaces or the like when data is transported through the system. Transport layer 90 includes a channelisation code tree 100 which is a database of data codes that comprise the corpus of code information or protocols necessary to set-up a channel in the 2G system. Thus, when the 2G system creates a new channel, the channelisation codes in the channelisation code tree protocol are accessed to determine from data in the data words received by the system what type of channel must be set-up and the particular channel parameters which will be associated with the newly set-up channels. Generally, transport layers 90 comprise transport resources which are occupied by the different and multiple channels which traverse through the layer 90. These resources are, for example, channel size, channel memory, transport bit rate, priority queuing, energy throughput, and other relevant parametric resources which must be allocated to the channel so that the channel can accurately traverse the system.

The channelisation code tree 100 will also set-up the channel according to whether the channel is a shared channel 110, i.e., it has certain parameters in common with other channels traversing the system, or is a dedicated channel 120 in that it is to be treated as a unique channel having transport resources exclusively dedicated to it for transport. In either case, once the channelisation code tree sets-up the channel, the transport layer determines whether there are indeed enough transport resources available to accommodate the channel and that no other existing channels will be disturbed by the allocation of resources to the new channel. This function has been typically performed by the CAC verification procedure 130 mentioned above. The CAC verification procedure 130 is a conventional procedure implemented in software which checks to see whether enough transport resources are available in the transport layer to accommodate the existence of the new channel during a data transfer procedure and whether the new data channel will disturb or otherwise interrupt data transport of other channels when the new channel is impressed on the system. If the CAC procedure 130 determines that there are not enough resources currently to support the new channel through transport layer 90, then the CAC procedure 130 disables the new channel's set-up until the resources become available in transport layer 90 to support the new channel. Similarly, if set-up of the new channel will unduly disturb, interrupt, slow down or degrade transport of current channels through transport layer 90, then the CAC procedure 130 will not allow the new channel to be set-up. It will be recognized by those skilled in the art that the RNCs 50 will not have, a record of the particular channelisation codes that have been reserved for the channels, but rather that a certain number of codes in the WCDMA corpus of codes have been so reserved. Therefore, when a mobile terminal or terminals requests use of the reserved codes for the shared channel and such reserved codes are accessed, the RNC will not allow the entire amount of reserved resources to be depleted but will reserve some of the resources for use by a dedicated channel which may also require the resources. In such a case, the mobile terminals will have to wait for another code in the tree of reserved codes to become available and allocate its resources to the needs of the mobile terminal.

Use of the CAC procedure 130 thus requires implementation of a separate software routine to adequately make the above-referenced determinations and set-up new channels. The CAC routine is computationally dense from a data processing point-of-view, so use of the CAC procedure greatly complicates and slows down channel set-up, thereby reducing overall data throughput in the system. Moreover, the use of the CAC procedure 130 itself monopolizes a large portion of the transport resources. These are detrimental effects on the system which will be unacceptable for the higher speed 3G WCDMA systems which will handle denser, more numerous channels traversing the transport layer at greater speeds. Therefore, use of CAC procedures, or other channel setup verification procedures currently in use which utilize processor time and transport resources to set-up the new channels are not acceptable.

Figure 2B:
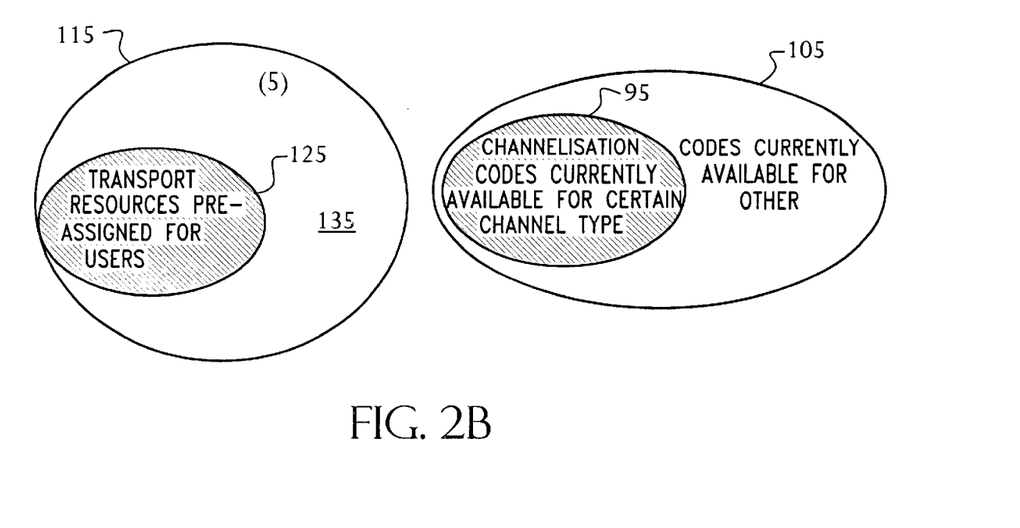
FIG. 2B depicts the branching of codes in accordance with the invention.

FIG. 2B depicts transport resources and radio resources which will be allocated in accordance with the invention. As will be described in more detail below, pre-reserved portions of the code tree may be reconfigured over time according to the particular need of the system. It is preferred that the transport resources match the channelisation code portion in terms of bandwidth. For a communication channel in cellular system (2G or 3G), there are resources available both in the radio interface (radio resources) and in other system interfaces (transport resources for the corresponding transport connection). An established channel between the network and the mobile station 70 implicitly means that the radio channel and transport connections have been established.

A channelisation code is an essential part of the radio resources in a CDMA and WCDMA system along with the transmission power of the radio link. Transport resources, for example bandwidth and buffer capacity, represent resources of the other system interfaces (other than the radio interface), and are, for example, the Iub and Iur interfaces. A channelisation code defines the channel in the WCDMA system and is analogous to a time slot in a TDMA system. The channels.are therefore separated from each other by the channelisation codes. From the channelisation codes, the raw bit rate of the corresponding channel in the radio interface can be determined as well and vice-versa. Moreover, the channelisation code of the corresponding channel in the radio interface is identified by a code ID (which in the WCDMA system is called Transport Format Indication (TFI) wherein the channelisation code is part of the Transport Format definition). The code ID is conveyed from the RNC over the Iub/Iur interface to the base station along with the data payload.

In accordance with the invention, a portion of the channel codes in the entire corpus of available codes 105 are assigned for certain channel types. Particularly, channelisation codes which provided for fast packet data access will be reserved in accordance with the invention although codes with any characteristics can be reserved. Additionally, depending on the expected or needed channel capacity, the size of the reserved portion 95 as a function of the number of codes and the peak capacity of the codes can be modified. A modification of this nature is not expected to happen frequently but the interval can be on the order of about 100 to about 1000 milliseconds or larger.

On the Iub/Iur interfaces, the transport resources 115 can be similarly partitioned to a reserved branch 125. This portion of the code tree. 125 is dedicated for a particular channel type while the remainder of the resources 135 are preferably unreserved. The sizes of portions 125, 135 which signify different "resource domains" is preferably matched in terms of supporting capacity. As a result, the transport resource management need not perform any CAC or resource reservation function for a channel that is being set-up, provided that the channelisation code for the channel has been taken from the reserved channelisation codes 95. This allows for the transport connection establishment in the Iub/Iur interface for a given channel to be much simpler than it is in prior art approaches which thereby results in a faster channel set-up. Such results have not heretofore been achieved in the art.

Figure 2C:
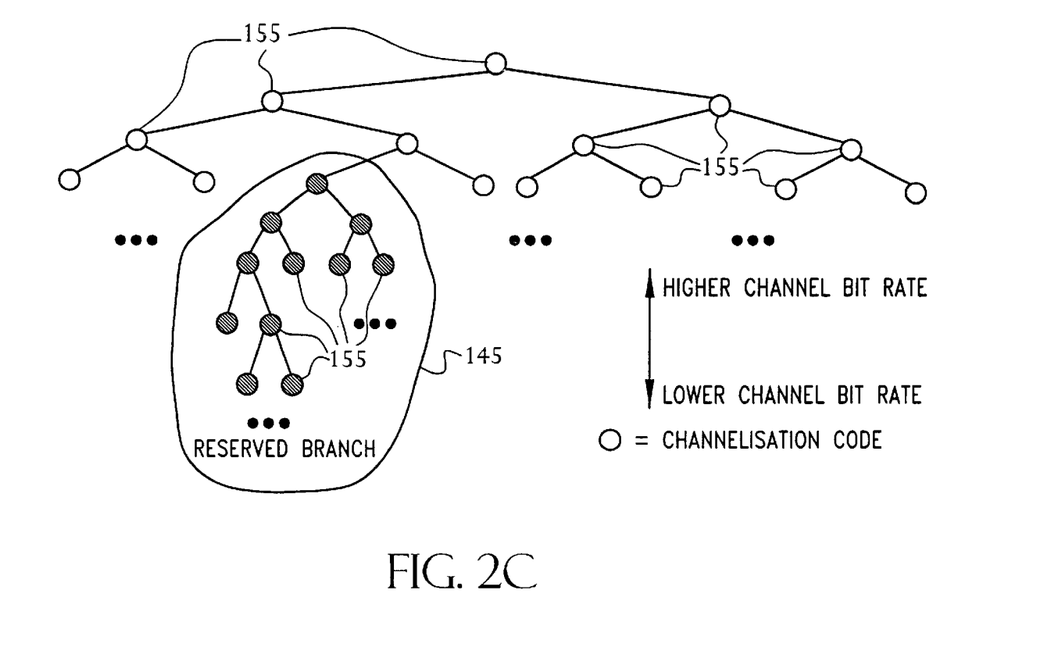
FIG. 2C depicts a code tree having a reserved branch of codes in accordance with the present invention.

FIG. 2C depicts an exemplary code tree utilized in the present invention having a reserved branch 145. Each node 155 represents one channelisation code. Typically, channelisation codes in WCDMA systems are orthogonal codes and the tree structure of FIG. 2C is thus a common way of representing the relationship of the codes 155. This structure depicts the mutual relationship or orthogonality of codes 155 with respect to each other and so if a code is taken into use (a "mother code"), all the codes below the mother code in the tree structure or branch will become unusable due to the orthogonal relationship. Therefore, if the highest code in the reserved branch 145 (black nodes in FIG. 2C) represents a code offering, for example, 256 kbit/second channel bit rate, and then the two next lower codes both will offer 128 kbit/second channel bit rate. Further, the next level will offer 64 kbit/second bit rate and so on. Thus, the reserved branch 145 can effectively offer 256 kbit/second aggregate rate, but the number of served users vary depending on the individual channel rates, i.e. the codes that are used.

Moreover, the number of channelisation codes 155 in the tree depends on the types of codes and is therefore system dependent. A code itself cannot be partitioned into branches, however in accordance with an advantageous aspect of the invention the codes can be branched to form a tree-like structure as is shown in FIG. 2C. That is, a set of codes can be pre-reserved in accordance with the invention from the entire available code-space which is depicted in FIG. 2C.

Figure 3:
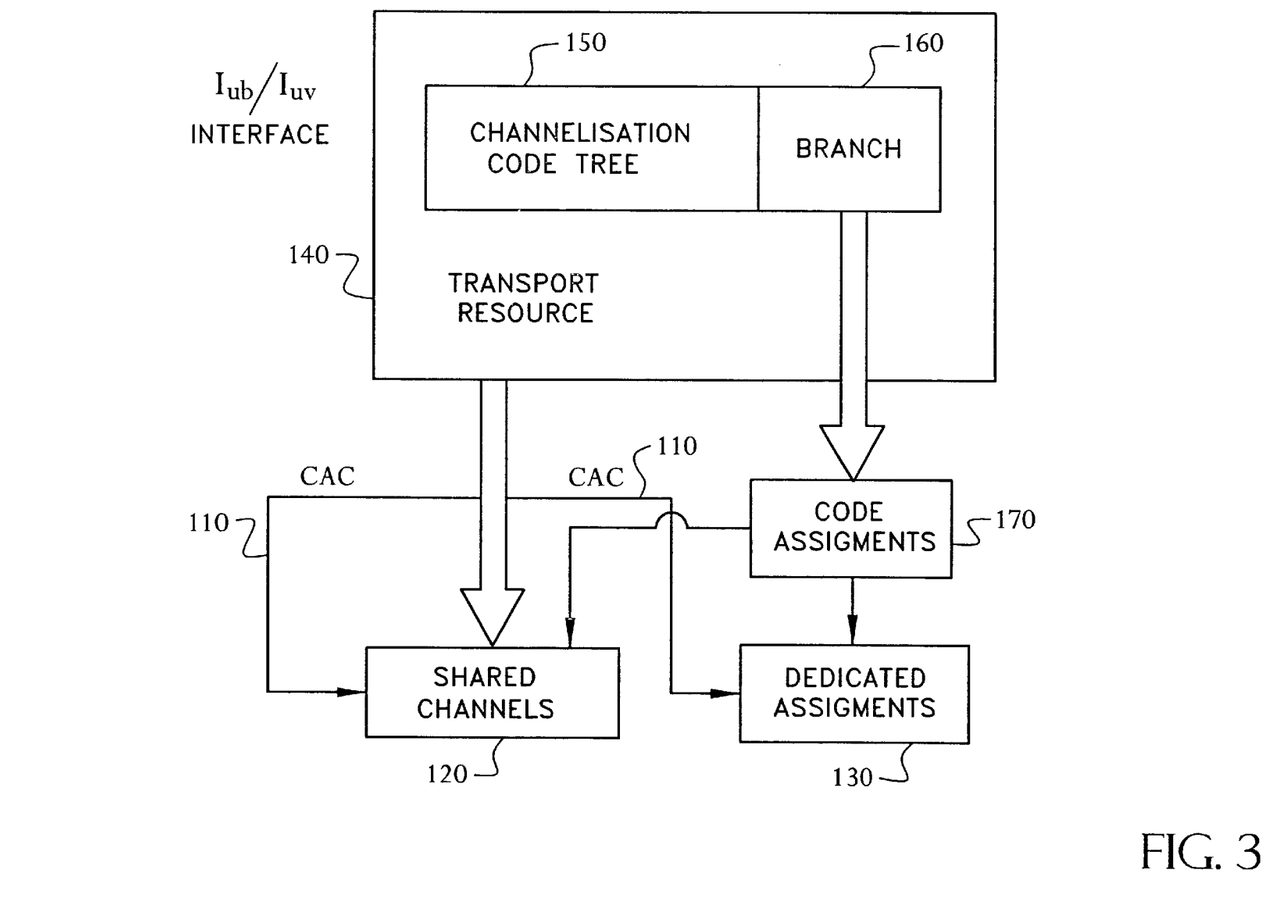
FIG. 3 depicts a simplified block diagram of a transport layer of the present invention implementing the inventive channelisation techniques.

Referring to FIG. 3, a transport layer 140 similarly comprises a channelisation code tree 150 for setting-up channels and allocating resources. The channels to be set-up can be shared channels 120 or dedicated channels 130, a combination of the two, or any other types of channels that will exist in the 3G WCDMA system. The transport layer 140 exists as a result of the need for the Iub/Iur interfaces to communicate data in channels through the system, so channelisation codes 150 also contain the complete protocol for setting-up channels and configuring the channels so that they can efficiently traverse through the WCDMA system.

In accordance with a preferred embodiment of the invention, the channelisation tree is partitioned into at least one branch 160 that contains at least one code of the channelisation code tree 150. More than one branch 160 can be created in accordance with the present invention and more than one code may reside in each branch depending on the particular needs of the WCDMA system and the design parameters of the system. The number of branches 160 and particular number and types of codes found in each branch are a matter of design choice that will be governed by the needs and specifications of the WCDMA system. The number and contents of the branches 160 are adjusted based on these needs and specifications.

Once branch 160 is partitioned, when a new channel is impressed on the system, the codes in the branch 160 automatically set-up the channel. Since the branch is established prior to receipt of a data message from the system requesting a new channel set-up, the transport resources are pre-reserved to accommodate the new channel, and no separate, independent verification procedure such as, for example, the aforementioned prior art CAC procedure, need be implemented to determine if the current transport resources can handle the channel set-up. This greatly reduces the time in which it takes to set-up the new channel and greatly enhances the system's overall performance since no transport resources are necessary to perform resource verification and allocation as must be accomplished in the prior art transport layer 90 described above. In accordance with the invention, the branch 160 simply assigns codes 170 to the new channels and since the transport resources have already been pre-reserved or allocated due to the partitioning of the codes into branch 160 the new channels are automatically set-up.

It is also possible to combine a CAC procedure to the set-up of new channels in the transport layer 140 when it is desired that not all of the channels have their transport resources pre-reserved. Thus, for example, when other than pre-reserved channels must be set-up in the system, it will also be possible to combine the inventive branch codes 160 and code assignment 170 scheme with a CAC or other verification procedure 110 to accommodate such needs.

The transport layer can be notified in many ways that the new channel should be assigned a code from branch 160 of the code tree. For example, a separate assignment byte could be transmitted indicating to the transport layer 140 that the new channel should be set-up according to the reserved codes. Alternatively, a single bit or a plurality of data bits could be received by the transport layer 140 independent from any channel data having been generated by an RNC 50 to indicate to the transport layer 140 that the channel should be set-up according to the reserved codes in the branch 160. The establishment of the channel is always done by an RNC 50, as is the case for the transport connection conveying the channel on the Iub/Iur interface. Thus, there is a signaling protocol between the radio resources management logical entity and the transport resources management logical entity which is completely internal to the RNC 50. Generally, the RNC 50 handles all transport resources for the downlink direction and the base station may handle these resources on the uplink direction. If there is a need to indicate to the base station over the Iub/Iur interface that the base station should use the pre-assigned transport resources 125, then this indication can be the code ID (TFI in WCDMA) signaled to the base station during establishment of the radio channel. Other equivalent methods of notifying the transport layer 140 that the next channel is to be set-up according to the reserved codes may be used.

Figure 4:
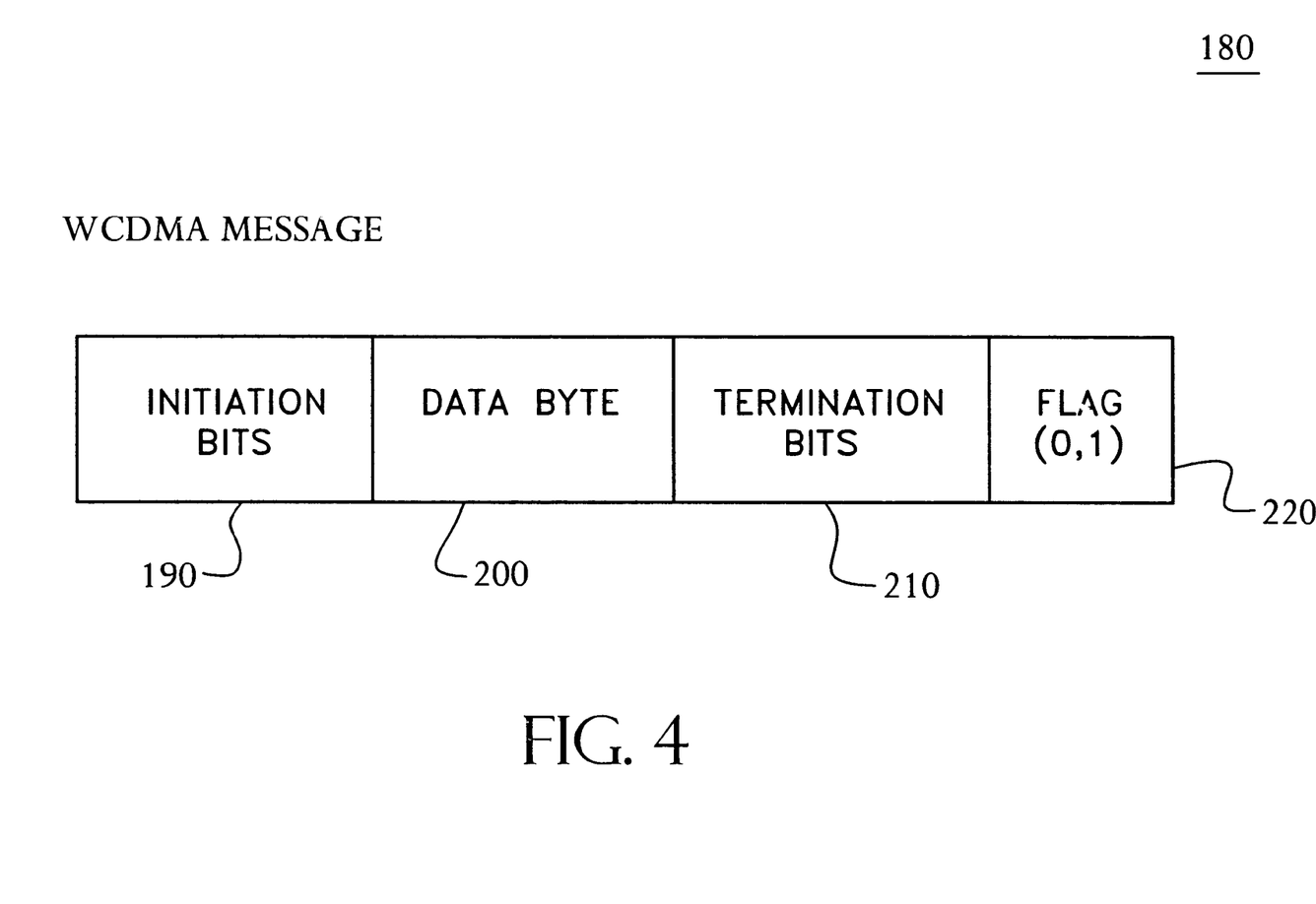
FIG. 4 depicts a data word generated by the 3G system of FIG. 1 wherein an originating node of the channel establishment data in the word is set to determine whether resources should be allocated by a reserved branch of channelisation codes so that a new channel can be set-up.

In a preferred embodiment, the transport layer is notified that the next channel should be set-up according to the reserved codes by a flag indicator which is a single bit in a data word that will inform the transport layer 140 that the incoming channel is to be set-up according to the reserved codes in the branch 160. Referring to FIG. 4, a data word 180 generated by a node B device includes several parts including a set of initiation bits 190 that provide an initial data set which sets forth where the word 180 originated. The actual byte of data 200 contains the data which is to be transported through the system, and a set of termination bits 210 is provided to indicate to the system that the data word 180 is ending and to provide any housekeeping data necessary to end the data word 180. In accordance with the invention, a flag indicator bit 220 is provided at the end of data word 180 which will tell the transport layer 140 to use or not use the reserved codes from branch 160 to set-up the channel which will transport data word 180. If flag indicator 220 is set to "1", for example, then the transport layer 140 will use the reserved codes, but if it is set to "0", then no channel will be set-up or other codes in the channelisation code tree 150 will be used and a verification procedure 10 will be implemented. Of course, the reverse scheme can alternatively be used where 0 is meant to indicate use of the codes in the branch and 1 is meant to indicate use of the unreserved codes.

The invention may be implemented as a software program which will be executable on any of the computer processors or microcontrollers found in the various components of the system of FIG. 1. This software will govern how to use the radio resources and the transport resources. Alternatively, the software embodying the invention can be integrated into an application specific integrated circuit (ASIC) or on a digital signal processing (DSP) chip. How the transport resource reservation is then implemented will be governed by the equipment architecture of the system, the particularly technology used to implement the system and other factors.

Figure 5:
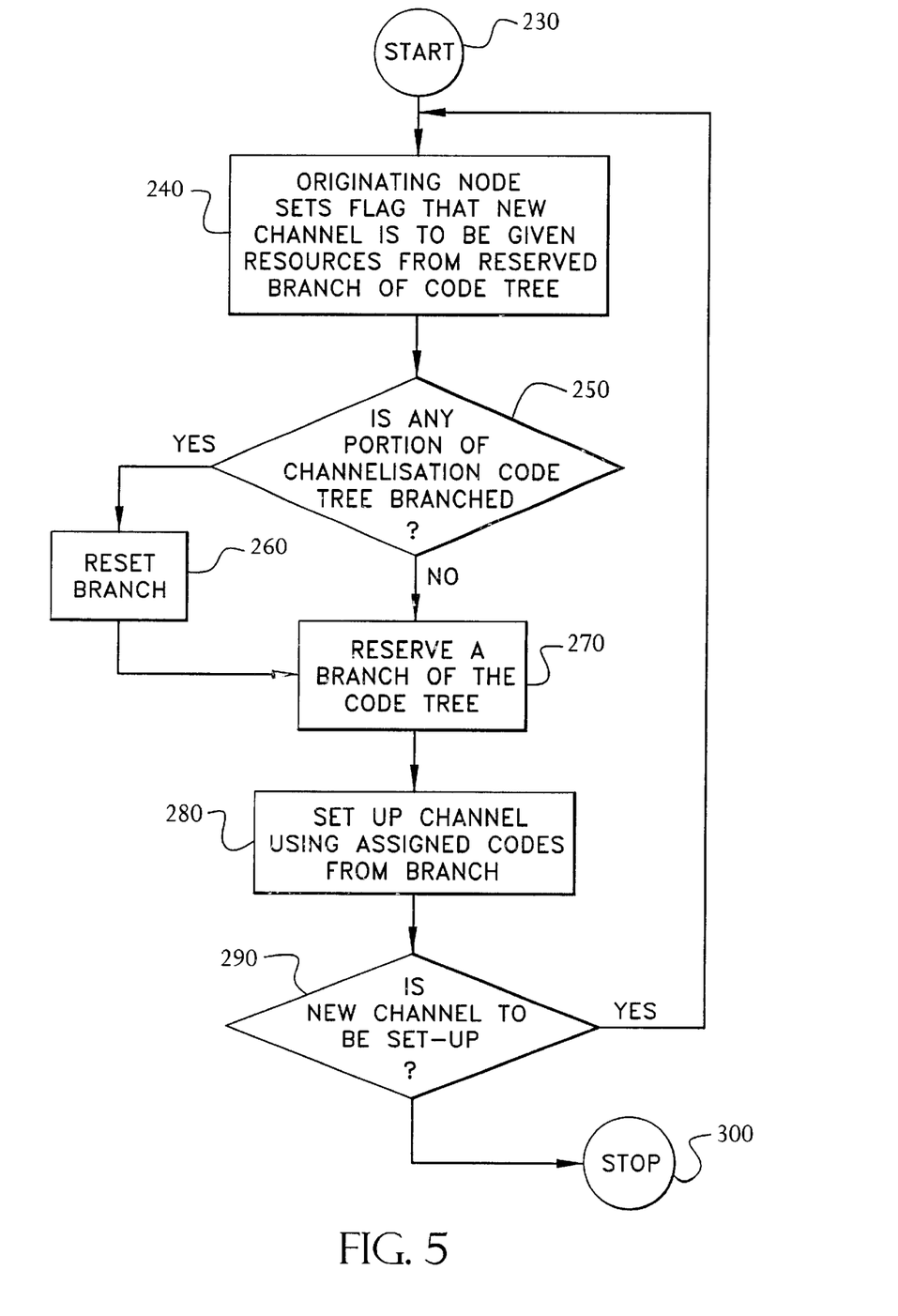
FIG. 5 is a flow chart of a preferred embodiment of channel set-up provided in accordance with the present invention.

Regardless of the type of computer or processing element used to implement the present invention, FIG. 5 depicts a flow chart of an exemplary embodiment which could be reduced to software or firmware for processing. The method begins at step 230, and at step 240 the originating node (node B) sets a flag of the data word to indicate to the transport layer that the new or next channel is to be allocated resources from the reserved codes in the partitioned branch of the code tree. It is then determined at step 250 whether there is any portion of the channelisation code tree that is already branched and, if so, at step 260 a branch may be reset and a new set of codes reserved in a new branch at step 270. Alternatively, the same branch of codes may be used to set-up the new channel or a combination of branches with separate sets of reserved codes may be utilized to set-up the new channel.

Regardless of whether the same branch codes, new branch codes, or a combination of new and old branch codes are used, at step 280 the new channel is set-up using the assigned and reserved codes from the branch(es). It is then determined at step 290 whether a new channel is to be set-up and, if so, the method returns to step 240. Otherwise, the method ends at step 300 and the data word is transported through the system with the correct resources.

The channel set-up provided in accordance with the present invention in WCDMA systems provides an efficient and simple means to allocate transport layer resources in high-speed data systems. By eliminating the need for a separate verification procedure, system resources will be effectively allocated and fast channel set-up will be achieved. Furthermore, utilization of a reserved set of branch codes to set-up a channel will eliminate cumbersome and repetitive use of precious computing resources by computationally dense verification procedures that slow down the overall throughput of data through the transport layer and which in themselves waste valuable system resources. Thus, the invention provides for resource allocation and channel set-up methods that maximize data speed and reduce the computational complexity of channel set-up. Moreover, the present invention is universally applicable to all vendor specific 3G equipment.

While there has been shown and described certain fundamental novel features of the present invention as applied to preferred embodiments thereof, it will be understood by those skilled in the art that various omissions and substitutions and changes in the devices and methods described herein, and in their operation, may be made by those skilled in the art without departing from the spirit and scope of the invention. It is expressly intended that all combinations of those elements and/or method steps which perform substantially the same function in substantially the same way to achieve the same result are within the scope of the invention. Substitution of elements from one described embodiment to another are also fully intended and contemplated. It is the intention, therefore, to be limited only as indicated by the scope of the claims appended hereto.

What is claimed is:

1. A method for setting up channels in a wideband code division multiple access (WCDMA) communication system through which WCDMA signals are transported in channels through a transport layer, and for effectively allocating WCDMA signal transport resources in the WCDMA system, comprising the steps of:

accessing a stored tree of codes that are provided to the WCDMA system which set out a channelisation protocol for the system so that the WCDMA signals will be transported through the WCDMA system in channels specified by the channelisation protocol;

partitioning at least one of the codes in the tree of codes into a branch of codes prior to receiving a request for a new channel, thereby reserving a set of resources in the WCDMA system for set-up of the channel which is associated with the branch of codes; and setting up the channel according to set-up data found in the branch of codes which relates to the channelisation protocol, thereby allocating the set of resources to the set-up channel according to the set-up data found in the branch of codes.

2. The method of claim 1, wherein the channels comprise shared channels.

3. The method of claim 2, wherein the channels comprise dedicated channels in addition to the shared channels.

4. The method of claim 1, wherein the step of setting up the channel comprises assigning codes from the branch of codes so that the new channel is allocated the resources which have been pre-reserved for it by the branch.

5. A method for setting up channels in a wideband code division multiple access (WCDMA) communication system through which WCDMA signals are transported in channels through a transport layer, and for effectively allocating WCDMA signal transport resources in the WCDMA system, comprising the steps of:

accessing a stored tree of codes that are provided to the WCDMA system which set out a channelisation protocol for the system so that the WCDMA signals will be transported through the WCDMA system in channels specified by the channelisation protocol;

partitioning at least one of the codes in the tree of codes into a branch of codes, thereby reserving a set of resources in the WCDMA system for set-up of the channel which is associated with the branch of codes;

setting up the channel according to set-up data found in the branch of codes which relates to the channelisation protocol by assigning codes from the branch of codes so that the new channel is allocated the resources which have been pre-reserved for it by the branch, thereby allocating the set of resources to the set-tip channel according to the set-up data found in the branch of codes; and notifying the transport layer that a new channel is to 6c assigned a code from the branch of codes.

6. The method of claim 5, wherein the notifying step comprises the step of setting a flag indicator bit in a data word corresponding to the WCDMA signal being transported through the transport layer to a state indicating that the new channel is to be assigned a code from the branch of codes.

7. A wireless wideband, code division multiple access (WCDMA) communication system, comprising:

a plurality of radio networks each further comprising a radio network controller, a logical device in communication with the radio network controller for generating WCDMA signals that will be communicated through a transport layer in the communication system, and a radio network interface unit between the radio network controller and the logical device for coordinating data transmission in the radio network; and a system interface unit in communication with each of the radio network controllers in the radio networks for controlling transport of the WCDMA signals between the radio networks, wherein the communication between the radio network interface units and the system interface unit creates a transport layer through which the WCDMA signals are transported in channels, and wherein WCDMA signal transport resources are allocated by accessing a tree of codes that are provided to the WCDMA system which set out a channelisation protocol for the system so that the WCDMA signals will be transported through the WCDMA system in channels specified by the channelisation protocol, partitioning at least one of the codes in the tree of codes into a branch of codes prior to receiving a request for new channel, thereby reserving a set of resources in the WCDMA system for set-up of the channel which is associated with the branch of codes, and setting up the channel according to set-up data found in the branch of codes which relates to the channelisation protocol, thereby allocating the set of resources to the set-up channel according to the set-up data found in the branch of codes.

8. The communication system of claim 7, wherein the channels comprise shared channels.

9. The communication system of claim 8, wherein the channels comprise dedicated channels in addition to the shared channels.

10. The communication system of claim 9, wherein the step of setting up the channel comprises assigning codes from the branch of codes so that the new channel is allocated the resources which have been pre-reserved for it by the branch.

11. A wireless wideband, code division multiple access (WCDMA) communication system, comprising:

a plurality of radio networks each further comprising a radio network controller, a logical device in communication with the radio network controller for generating WCDMA signals that will be communicated through a transport layer in the communication system, and a radio network interface unit between the radio network controller and the logical device for coordinating data transmission in the radio network; and a system interface unit in communication with each of the radio network controllers in the radio networks for controlling transport of the WCDMA signals between the radio networks, wherein the communication between the radio network interface units and the system interface unit creates a transport layer through which the WCDMA signals are transported in channels, and wherein WCDMA signal transport resources are allocated by accessing a tree of codes that are provided to the WCDMA system which set out a channelisation protocol for the system so that the WCDMA signals will be transported through the WCDMA system in channels specified by the channelisation protocol, partitioning at least one of the codes in the tree of codes into a branch of codes, thereby reserving a set of resources in the WCDMA system for set-up of the channel which is associated with the branch of codes, setting up the channel according to set-up data found in the branch of codes which relates to the channelisation protocol by assigning codes from the branch of codes so that the new channel is allocated that resources which have been pre-reserved for it by the branch, thereby allocating the set of resources to the set-up channel according to the set-up data found in the branch of codes, and notifying the transport layer that a new channel is to be assigned a code from the branch of codes.

12. The communication system of claim 11, wherein the notifying step comprises the step of setting a flag indicator bit in a data word corresponding to the WCDMA signal being transported through the transport layer to a state indicating that the new channel is to be assigned a code from the branch of codes.

13. The method of claim 4, further comprising the step of notifying the transport layer that a new channel is to be assigned a code from the branch of codes.

14. The method of claim 13, wherein the notifying step comprises the step of setting a flag indicator bit in a data word corresponding to the WCDMA signal being transported through the transport layer to a state indicating that the new channel is to be assigned a code from the branch of codes.

15. The communication system of claim 10, further comprising the step of notifying the transport layer that a new channel is to be assigned a code from the branch of codes.

16. The communication system of claim 15, wherein the notifying step comprises the step of setting a flag indicator bit in a data word corresponding to the WCDMA signal being transported through the transport layer to a state indicating that the new channel is to be assigned a code from the branch of codes.

* * * * *